United States Patent
Dalton et al.

(10) Patent No.: US 7,583,898 B1
(45) Date of Patent: Sep. 1, 2009

(54) SIGNAL-DETECT-BASED RANGING TECHNIQUE FOR BURST-MODE OPTICAL SYSTEMS

(75) Inventors: Rodger Dalton, Wake Forest, NC (US); Eugen H. Ruegg, Cary, NC (US); Jason Teeter, Apex, NC (US)

(73) Assignee: Alcatel Lucent, Paris (FR)

( * ) Notice: Subject to any disclaimer, the term of this patent is extended or adjusted under 35 U.S.C. 154(b) by 538 days.

(21) Appl. No.: 11/403,261

(22) Filed: Apr. 13, 2006

(51) Int. Cl.
*H04J 14/08* (2006.01)
(52) U.S. Cl. .................... 398/100; 398/67; 398/208
(58) Field of Classification Search ............. 398/66–67, 398/202, 208–209
See application file for complete search history.

(56) References Cited

U.S. PATENT DOCUMENTS

2002/0114028 A1* 8/2002 Eijk et al. ............... 359/110
2006/0171714 A1* 8/2006 Dove ....................... 398/71

* cited by examiner

*Primary Examiner*—Leslie Pascal (57) ABSTRACT

In a passive optical network (PON), a burst-mode receiver of an optical line terminator (OLT) is initialized during an initialization phase, such as ranging, by asserting one or more reset signals in response to detecting the presence of a packet signal. For example, after the OLT transmits an initialization message, such as a ranging grant, to an optical network unit (ONU), it asserts one or more reset signals when it detects the presence of a packet signal received from the ONU in response.

21 Claims, 5 Drawing Sheets

SIGNAL-DETECT-BASED RANGING TECHNIQUE FOR BURST-MODE OPTICAL SYSTEMS

BACKGROUND OF THE INVENTION

1. Field of the Invention

The present invention relates generally to data transmission in a passive optical network (PON) and, more specifically, to an improvement in the ranging process that is performed prior to initiating (time-division multiplexed) upstream transmissions.

2. Description of the Related Art

Most digital telecommunications networks (i.e., networks that facilitate the communication of data, voice, video, etc., between parties or between a content distribution service and subscribers) typically comprise active components, such as repeaters, relays and other such devices that consume power, in the path between an exchange and a subscriber. In addition to requiring power, active components are subject to failure and performance degradation over time, and may require significant periodic maintenance. The passive optical network (PON) has been developed to overcome some of these deficiencies. The essence of a PON is that nothing but optical fiber and passive components are found in the path between the exchange and subscribers. A single fiber can run from the exchange to a passive splitter located near a group of subscribers, such as a neighborhood or office complex, and individual fibers can run from the splitter to individual subscribers or sub-groups of subscribers.

The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). These standards and recommendations are well-known to persons skilled in the art to which the invention relates and are therefore not described in further detail herein (i.e., in this patent specification).

In accordance with these standards and recommendations, a PON comprises an optical line terminator (OLT) at the exchange or central office and a number of optical network units (ONUs), also known as optical network terminals (ONTs), each located at or near the subscriber's premises (e.g., home, office building, etc.), with optical fiber and splitters between the OLT and ONUs. In the downstream direction, i.e., data transmitted from the exchange to a subscriber, the data packets (also referred to as cells) are broadcast from the OLT to all of the ONUs in the network, and an ONU can select the data to receive by matching the address embedded in the data units to a selected address. In the upstream direction, i.e., data transmitted from a subscriber to the exchange, the data units are time-division multiplexed with those transmitted from other subscribers. These systems are sometimes referred to as burst-mode PON technologies because they transmit bursts of data packets at relatively high bit rates.

The amplitude of the upstream signal received at the OLT generally varies from ONU to ONU. The amplitude differences occur for a number of reasons, including the number of splits in the paths and the different distances from the OLT at which the ONUs may be located. Bit errors can occur if the OLT receiver threshold is too high or too low to detect the bits of a packet. To account for differences in amplitudes of signals received from different ONUs, the G984 specifications provide for the OLT to "train" its receiver to each upstream packet, i.e., adjust itself to the amplitude range of that packet, in order to receive the packet data without errors. The specifications provide for inclusion of a preamble preceding the data bits of each packet to use in training the OLT receiver. After an initialization procedure, described below, involving applying a reset signal, the OLT adjusts its receiver's detection threshold upward or downward until the threshold is centered half way between the logic "1" legal and the logic "0" level. When the detection threshold has been successfully centered between the logical levels, the received data will be recovered without duty cycle distortion, which is necessary to the process of recovering the clock signal from the combined clock-data signal.

In accordance with the ITU standards and recommendations, in the upstream direction each ONU is to transmit a data packet only during its assigned timeslot. Nevertheless, because some ONUs may be located at different distances from the OLT than other ONUs, differences in propagation delays may cause data packet transmissions to overlap slightly in time and become garbled with each other at splitters/combiners. A synchronization measure known as "ranging" is employed to prevent such overlap or collisions. Ranging is a method that comprises the OLT calculating a propagation delay between it and each ONU in the PON. The OLT does this by transmitting a ranging window message indicating that ranging is to begin. Any ONU that has not already been ranged responds by transmitting a reply. (Additional steps, not described here for purposes of clarity, are taken to ensure that replies from different ONUs do not collide.) The reply, much like any data packet, includes a delimiter or predetermined bit pattern between the preamble and the data bits that follow the preamble. When the received bits match the expected delimiter, the OLT calculates the time differential between the sending of the ranging grant and the receipt of the ranging response. From the time differential, the OLT can calculate an equalization (EQ) delay for the ONU that will allow the ONU to adjust its upstream transmissions so that they arrive at the OLT precisely within the time slot assigned to that ONU. After the ONU receives its calculated EQ delay from the OLT, ranging is deemed completed for that ONU.

Ranging is generally performed as soon as an ONU is powered on or otherwise brought into the PON, or upon initialization of PON operation, but it can also be performed periodically thereafter to ensure that all ONUs in the PON have been ranged.

Figure 1:
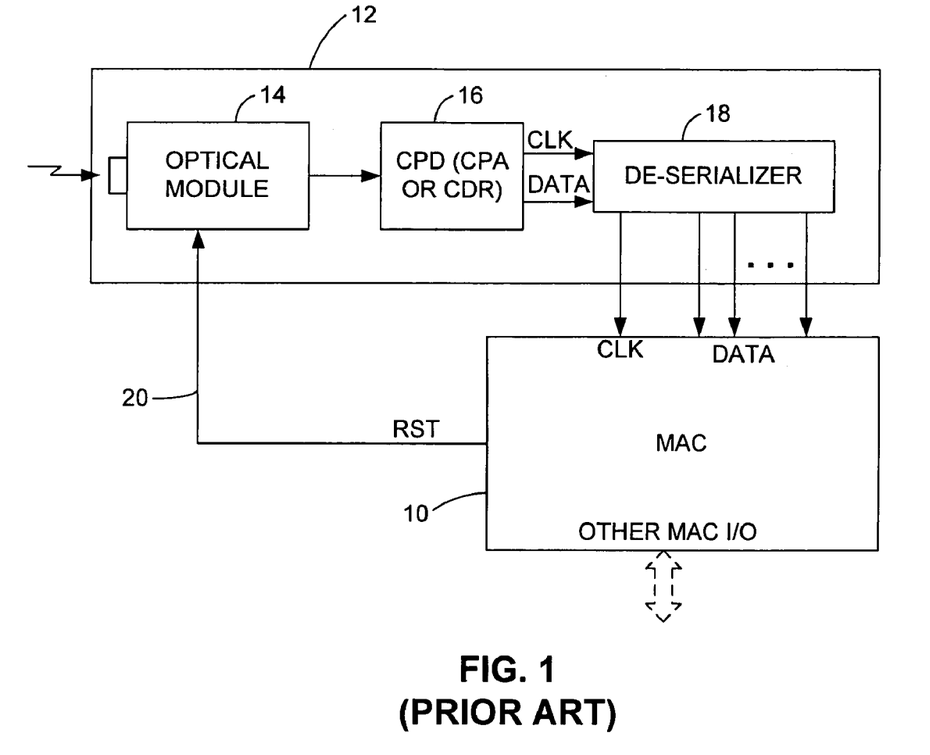
FIG. 1 is a generalized block diagram of a prior art burst-mode receiver for a passive optical network (PON).

As shown in FIG. 1, a prior or conventional OLT has a media access controller (MAC) 10 that controls the majority of OLT functions and thus is analogous to a central processor. The burst-mode transceiver circuitry of the OLT (only the receiver portion 12 of which is shown in FIG. 1 for purposes of clarity) includes an optical module 14, a clock processing device (CPD) 16, and a data de-serializer 18. Optical module 14 receives the optical signal from the PON (i.e., transmitted by an ONU) and detects the waveform transitions that represent the packet preamble and data bits. To detect the data bits without errors, it performs the above-described training process on each packet preamble. That is, it adjusts itself to respond to bit transitions in the amplitude range of the preamble. In PON architectures in which each ONU generates a clock signal that it maintains at the same frequency as the reference clock signal that the OLT generates, CPD 16 is typically a clock phase aligner (CPA) device that merely determines the phase difference between the ONU clock and OLT clock. In other PON architectures, CPD 16 may be a clock-data recovery (CDR) device that recovers a clock signal from the received signal and uses the recovered clock signal to sample the data bits from the received signal. In either case, CPD 16 receives the detected bit stream and outputs a clock signal and an accompanying (serial) data bit stream. In architectures in which CPD 16 is a CPA, it is generally unable to perform its function unless the information it receives is completely undistorted. Regardless of CPD type, all architectures have limits on the amount of duty cycle distortion and jitter they can tolerate. To minimize the amount of distorted preamble information that reaches CPD 16, it is important that the optical module 14 train itself as quickly as possible. De-serializer 18 converts the bit stream to multi-bit words, synchronized with the clock, for use by MAC 12. Note that other portions of the OLT that do not directly relate to the present invention are not shown in FIG. 1 for purposes of clarity.

In a conventional OLT, MAC 12 can assert a reset signal 20 ("RST") that causes optical module 14 to re-adjust its detection threshold in preparation for receiving a data packet. In other conventional OLT architectures (not shown), the MAC can assert another reset signal that causes the CPD to re-acquire the clock signal. In normal operation, i.e., when the ONUs are transmitting ordinary data packets to OLT 10, MAC 12 can determine with some precision the beginning of a timeslot in which an ONU signal is expected to be received. A problem arises, however, when the packet is not an ordinary data packet, but rather a ranging reply, because MAC 12 cannot determine when a ranging reply will be received. A reply could be received at any time within the ranging window, the length of which is set to a relatively large predetermined worst-case length (e.g., 200 microseconds) to account for ONUs that may be far from the OLT. Due to this uncertainty, it has been suggested that MAC 12 simply assert reset signal 20 immediately after OLT 10 transmits the ranging window message. In some architectures, however, the reset signal 20 causes the optical module 14 to enter a high-gain mode. In the high-gain mode, optical module 14 is unduly sensitive to noise spikes and is thus very susceptible to producing spurious bit outputs. Although not all burst-mode optical receiver architectures necessarily behave in this manner with regard to entering a high-gain mode, essentially all such receivers suffer from the problem that the longer an input (light) signal is absent, the higher the probability that the receiver will produce a spurious output, which will almost always cause the MAC to produce errors. Determining the optimal condition or conditions under which to assert such a reset signal during ranging has been problematic in the art. The present invention addresses this problem and others in the manner described below.

SUMMARY OF THE INVENTION

The present invention relates to a method and system in which a burst-mode receiver of an optical line terminator (OLT) is initialized during an initialization phase by asserting one or more reset signals in response to detecting the presence of a packet signal. In one form of the invention, the OLT transmits an initialization message to an optical network unit (ONU), such as a ranging grant or other message indicating the initiation of ranging. When the OLT detects the presence of a packet signal received from the ONU in response to the initialization message, it asserts one or more reset signals that are provided to the burst-mode receiver.

In commercially available burst-mode receivers, there are typically one or more electronic elements that need to be reset (and thus have a pin or similar contact to which a reset signal is to be applied). One such reset signal can be, for example, a reset signal provided to the element known as the "optical module." Alternatively or in addition, such a reset signal can be a reset signal provided to a receiver clock processing device (CPD). The CPD can be a clock phase aligner (CPA), clock-data recovery (CDR) device, or similar device. The reset signal or signals can be asserted immediately upon detection of a packet signal or after a predetermined delay. In embodiments of the invention in which more than one reset signal is asserted, they can be asserted simultaneously, or alternatively, one reset signal can be delayed from another reset signal. For example, there can be a predetermined delay between asserting the reset signal applied to an optical module and asserting the reset signal applied to a CPD.

Asserting burst-mode receiver reset signals when the presence of a packet signal (i.e., light) is first detected minimizes the length of time that a signal is absent from the receiver input before the arrival of actual packet data and thereby minimizes the probability that the receiver will produce a spurious output.

DETAILED DESCRIPTION

Figure 2:
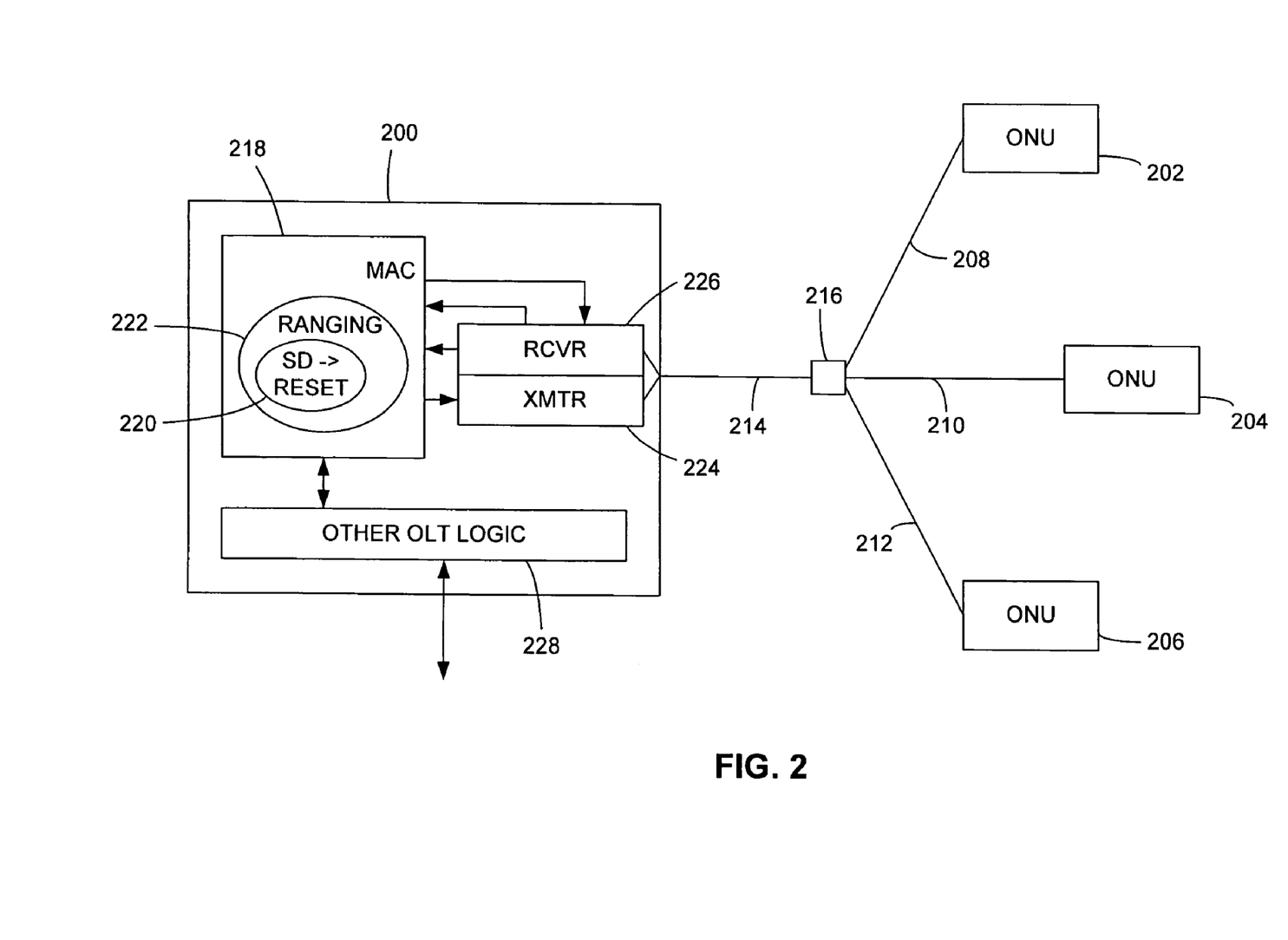
FIG. 2 is a generalized block diagram of a PON that includes an optical line terminator (OLT) in accordance with an exemplary embodiment of the invention.

As illustrated in FIG. 2, in an exemplary embodiment of the present invention a passive optical network (PON) includes an optical line terminator (OLT) 200 and a number of optical network units (ONUs) 202, 204, 206, etc. The OLT 200 is interconnected in the conventional manner with each ONU 202, 204, 206, etc., by optical fibers 208, 210, 212, 214, etc., and one or more optical splitters 216, etc. Although only one such splitter 216 and three such ONUs 202, 204 and 206 are shown for purposes of illustration, the PON can have any other suitable topology and number of ONUs, splitters, fibers, etc. The OLT 200 can be located at, for example, an exchange or central office from which services are provided, such as distribution of television programming and provision of Internet access. The ONUs 202, 204, 206, etc., can be located at, for example, residences or other premises occupied by subscribers to such services. Although data communication in the PON is bidirectional, the present invention relates primarily to the ranging process that is performed as an initialization step in preparation for data communication in the upstream direction, i.e., from any of ONUs 202, 204, 206, etc., to OLT 200. The communication of data on the PON occurs in the manner well-understood in the art, using any of a number of suitable conventional technologies, such as asynchronous transfer mode (ATM) protocol, and is therefore not described herein in further detail. The present invention relates not to the communication protocols or content of what is communicated, but rather to the ranging process, described below, that typically occurs when the PON is initially brought into operation, or at such time as it is re-configured, modified, augmented, etc., or at any other suitable time.

The OLT 200 includes a media access controller (MAC) 218 that controls the majority of OLT functions and thus is analogous to a central processor. MAC 218 is programmed or configured in accordance with the present invention to include "signal-detect (SD)-to-reset" control logic 220, such as suitable software or firmware, which controls the method of operation described below with regard to FIGS. 4-5. SD-to-reset control logic 220 can be included as part of ranging logic 222. SD-to-reset control logic 220 and ranging logic 222 are shown in generalized form for purposes of illustration as residing within MAC 218, but as persons skilled in the art will appreciate, this depiction is intended to indicate only that MAC 218 is programmed or configured to perform the corresponding functions of those elements and is not intended to imply any limitations as to where any corresponding software, firmware or other logic must actually or physically reside. As persons skilled in the art understand, such logic can be in any suitable form and can be disposed or distributed in any suitable manner, such as among a number of elements.

As well understood in the art, ranging is a method or process that comprises the OLT 200 calculating a propagation delay between it and each ONU 202, 204, 206, etc., in the PON. Ranging logic 222 and the well-known ranging process in general are not described in further detail herein but can include any suitable methods known in the art for ranging and related functions of the types typically performed in a PON or similar optical network. MAC 218 is also programmed or configured with other logic for controlling other OLT functions, but only SD-to-reset control logic 220 and ranging logic 222 are shown for purposes of clarity. In addition to MAC 218, OLT 200 includes an optical transmitter 224, optical (burst-mode) receiver 226, and other OLT logic 228. Other OLT logic 228 represents logic elements, such as processors, memories, data encoders and decoders, etc., that are conventional and typically included in prior OLTs of the type known in the art. The structure and function of such elements are well known in the art and therefore not described herein in further detail. In other embodiments of the invention, SD-to-reset control logic 220 can be separate from ranging logic 222 and instead included as part of other OLT logic 228. Transmitter 224 is similarly of the type well-known in the art and therefore not described herein. Transmitter 224 and receiver 226 together define an optical transceiver, although they can be physically integrated or not integrated with one another to any suitable extent.

Figure 3:
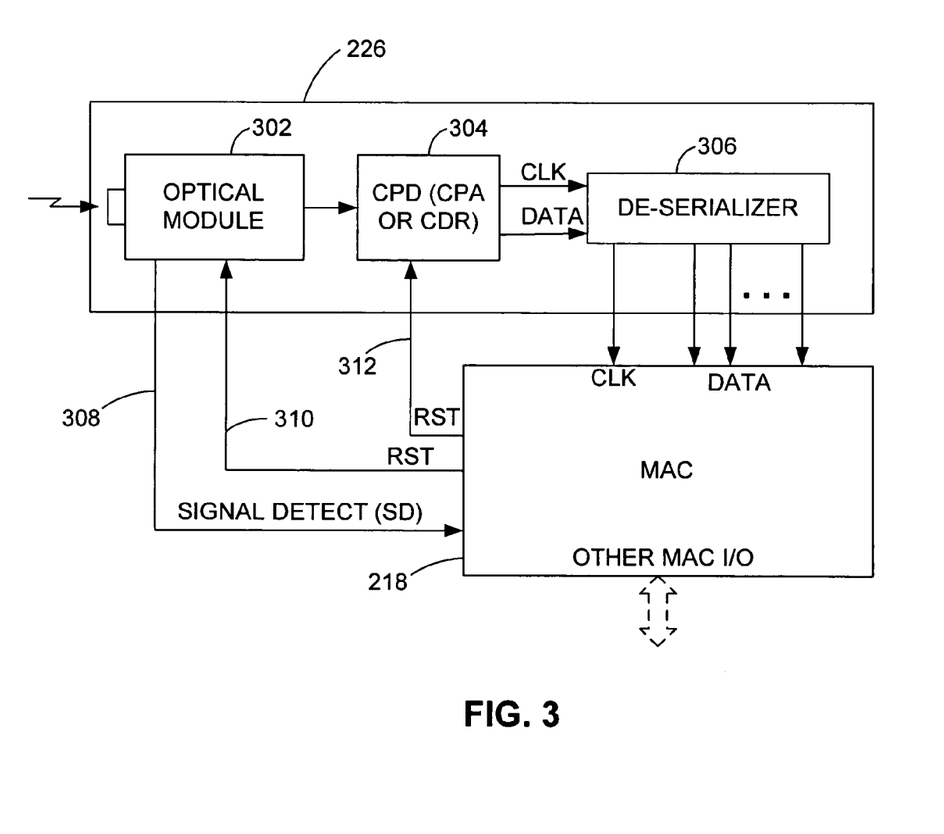
FIG. 3 is a generalized block diagram of an exemplary burst-mode receiver of the OLT of FIG. 2.

Receiver 226 is shown in further detail in FIG. 3 with MAC 218 and together they define a receiver control system. Receiver 226 includes an optical module 302, a clock processing device (CPD) 304, and a de-serializer 306, each of which is well-known in the art and commercially available. Other portions of receiver 226 that are not directly relevant to the present invention are not shown for purposes of clarity and can include any elements known in the art of the types typically included in burst-mode optical receivers. Receiver 226 has a well-known architecture in which the optical module 302 receives upstream optical signals transmitted on the PON and, in response, provides an output signal to CPD 304. CPD 304 in turn provides clock and data output signals to de-serializer 306, which provides the data in the form of parallel words to MAC 218. Note that optical module 302 has an output that produces a Signal Detect (SD) signal 308. Many commercially available optical modules 302 have such an output for indicating the presence or absence of an optical signal, but the output is typically either unused in prior receiver architectures or used only to report a loss of signal (LOS), i.e., that a malfunction has occurred in the fiber or upstream equipment. Optical module 302 also has an input that receives a Reset signal 310. CPD 304 similarly has an input that receives another Reset signal 312. CPD 304 can be a clock phase aligner (CPA), clock-data recovery (CDR) device, or other suitable clock processing device of a type that has a reset signal input.

Figure 4:
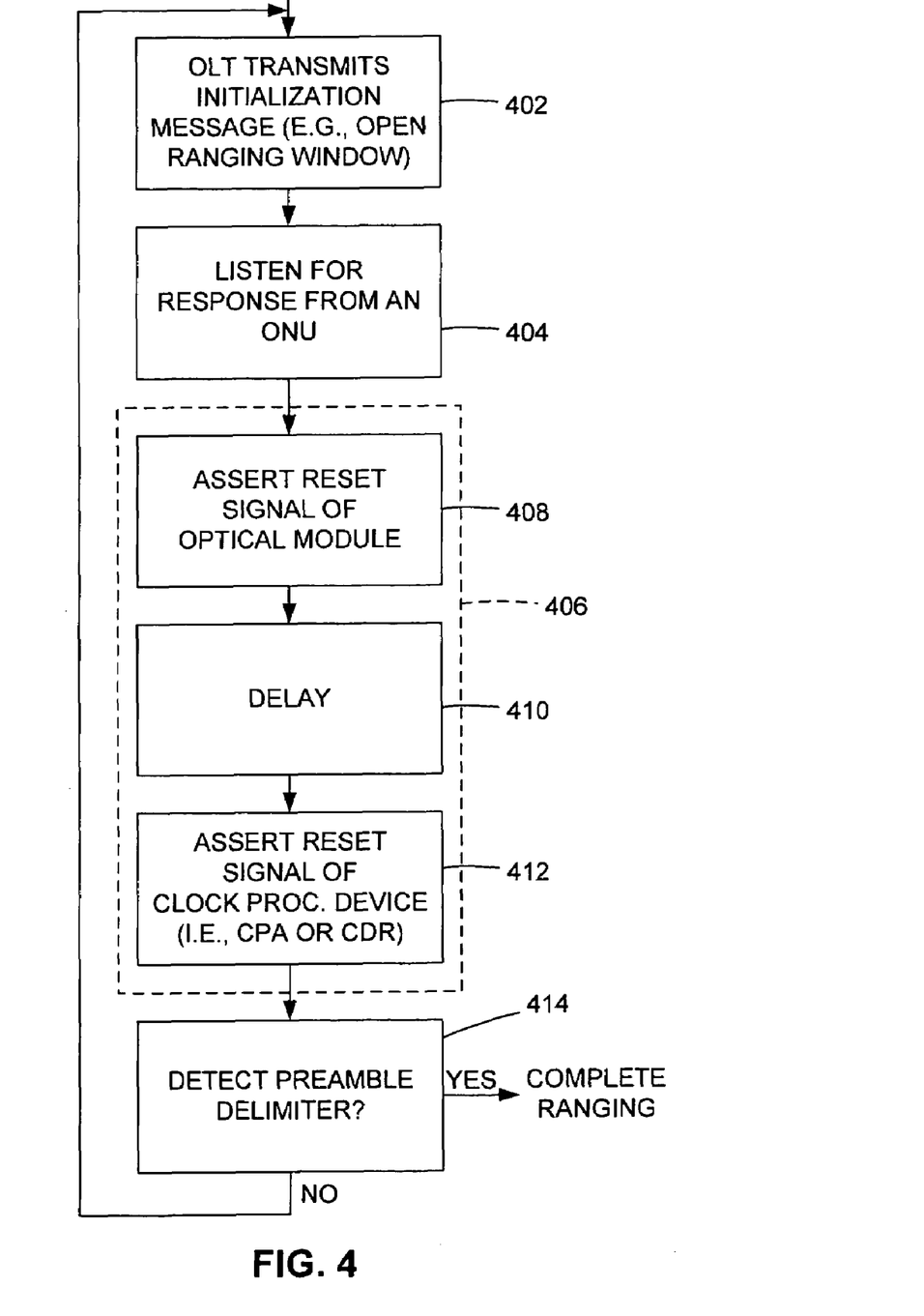
FIG. 4 is a flow diagram illustrating an exemplary method for asserting one or more reset signals provided to portions of the receiver illustrated in FIG. 2.

As illustrated by the flow diagram of FIG. 4, MAC 218 (FIG. 3) asserts Reset signals 310 and 312 in response to SD signal 308. The flow diagram represents an exemplary method that can be embodied in ranging logic 222 or other OLT logic 228 (FIG. 2). As indicated above with regard to FIG. 2, SD-to-reset control logic 220 causes Reset signals 310 and 312 to be asserted in response to SD signal 308. Persons skilled in the art to which the invention relates will readily be capable of programming or configuring MAC 218 to effect such methods in view of the teachings herein.

At step 402, OLT 200 (FIG. 2) transmits an initialization message indicating initiation of an initialization phase, such as ranging. For example, it can transmit a ranging grant message or other message indicating opening of a ranging window.

At step 404, OLT 200 listens or monitors for a response from one of ONUs 202, 204, 206, etc. (FIG. 2). In a conventional PON, an ONU responds to a message indicating initiation of ranging by transmitting a reply message. Optical module 302 (FIG. 3) detects the arrival of the reply message (i.e., the beginning of the data packet preamble) in a suitable manner, such as by comparing the power or other characteristic of the incoming optical signal with a predetermined threshold. As soon as the reply message begins to arrive at OLT 200 (as indicated by a characteristic that exceeds the threshold), optical module 302 asserts SD signal 308. In accordance with SD-to-reset control logic 220, MAC 218 responds to the assertion of SD signal 308 by asserting one or both of Reset signals 310 and 312, as indicated by step 406 in FIG. 4. For example, step 406 can comprise asserting Reset signal 310 at step 408, delaying some suitable predetermined time interval at step 410, and then asserting Reset signal 312 at step 412. The delay can be on the order of nanoseconds or tens of nanoseconds or any other suitable non-zero amount. Although in the illustrated embodiment of the invention both of Reset signals 310 and 312 are asserted (with a delay in between), in other embodiments only one of them is asserted. In still other embodiments, the various reset signals can be asserted simultaneously, with zero intentional delay in between, or they can be asserted in another order.

Although not shown for purposes of clarity, OLT 200 also trains itself on the preamble at this time in the conventional manner so that it can properly receive the data bits that follow the preamble. As indicated by step 414, when MAC 218 detects the preamble delimiter, indicating the end of the packet preamble and beginning of the packet data, it calculates the time differential between the sending of the ranging grant and the receipt of the ranging reply and otherwise completes the ranging process in the conventional manner. If MAC 218 fails to detect the preamble delimiter (within some predetermined timeout interval), it re-initiates another attempt at ranging at step 402.

Figure 5:
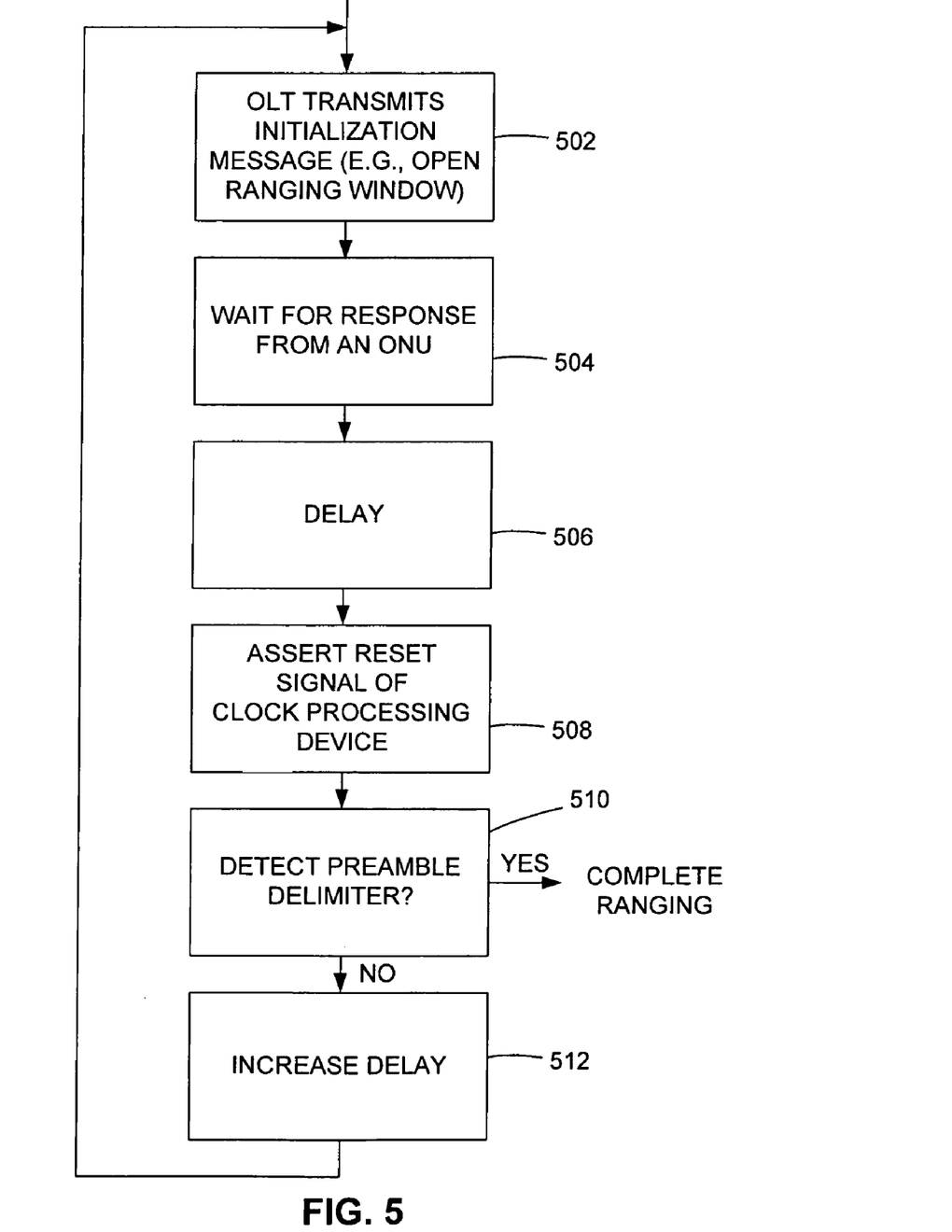
FIG. 5 is a flow diagram illustrating an alternative exemplary method for asserting one or more reset signals provided to portions of the receiver illustrated in FIG. 2.

As illustrated in FIG. 5, an alternative method may enhance performance in some instances. For example, especially in an embodiment of the invention in which optical module 302 receives no Reset signal 310, optical module 302 might assert SD signal 308 while it is still outputting distorted data. In such an instance, CPD 304 may be unable to acquire the correct phase lock, causing it to output garbled data and preventing MAC 218 from detecting the delimiter. It may enhance performance in such instances or others if the assertion of Reset signal 312 is delayed. (Note that it is delayed at step 410 in FIG. 4.) The method illustrated in FIG. 5 provides an adjustable or incremental delay. Steps 502 and 504 are identical to steps 402 and 404, described above. Step 506 is similar to step 410, described above, in that there is some suitable predetermined amount of delay between assertion of SD signal 308 and assertion of a reset signal (at step 508). In an embodiment of the invention in which optical module 302 receives no Reset signal 310, Reset signal 312 is thus asserted at step 508. Step 510 is identical to step 414, described above. If MAC 218 (FIG. 3) does not detect the preamble delimiter at step 510, however, then at step 512 it increments or otherwise increases the delay (to which step 506 refers) before returning to step 502 and re-initiating ranging. The increased delay provides more time for the opto-electronics of optical module 302 to settle and thus for distortion in the data it outputs to subside.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A burst-mode receiver control system for a passive optical network optical line terminator (OLT), comprising:
    a media access controller (MAC) for controlling OLT functions including controlling transmission of an initialization message to an optical network unit (ONU) indicating initiation of an initialization phase; and
    a burst-mode receiver, the burst-mode receiver detecting a presence of a packet signal received from the ONU in response to the initialization message and providing an indication thereof to the MAC, wherein in response to the indication the MAC asserts a reset signal provided to the burst-mode receiver, wherein the burst-mode receiver further comprises
        an optical module that receives optical signals representing data packets and performs a training process that in response to the indication, the MAC asserts a first reset signal provided to the optical module; and
        a clock processing device that in response to the indication, the MAC asserts a second reset signal provided to the clock processing device.

2. The burst-mode receiver control system claimed in claim 1, wherein the initialization phase comprises ranging, and the initialization message is used for ranging.

3. The burst-mode receiver control system claimed in claim 1, wherein the MAC delays a predetermined time interval between asserting the first reset signal and asserting the second reset signal.

4. The burst-mode receiver control system claimed in claim 3, wherein the predetermined time interval between asserting the first reset signal and asserting the second reset signal is delayed a predetermined amount if the training process fails.

5. The burst-mode receiver control system claimed in claim 1, wherein the clock processing device comprises a clock phase aligner device.

6. The burst-mode receiver control system claimed in claim 1, wherein the clock processing device comprises a clock-data recovery device.

7. The burst-mode receiver control system claimed in claim 1, wherein the training process uses a data packet preamble.

8. The burst-mode receiver control system claimed in claim 7, wherein the clock processing device is a clock phase aligner device.

9. The burst-mode receiver control system claimed in claim 7, wherein the clock processing device is a clock-data recovery device.

10. A method for initializing a burst-mode receiver of an optical line terminator (OLT) during an initialization phase in a passive optical network having an OLT and a plurality of optical network units (ONUs), comprising the steps of:
    transmitting an initialization message indicating initiation of the initialization phase from the optical line terminator to an ONU;
    detecting a presence of a packet signal received from the ONU in response to the initialization message; and
    asserting a reset signal provided to the burst-mode receiver in response to detecting the presence of the packet signal received from the ONU, wherein the step of asserting the reset signal to the burst-mode receiver further comprises:
        asserting a first reset signal provided to an optical module of the burst-mode receiver, wherein the optical module receives optical signals representing data packets and performs a training process; and
        asserting a second reset signal provided to a clock processing device of the burst-mode receiver.

11. The method claimed in claim 10, wherein the step of transmitting an initialization message comprises transmitting a message indicating initiation of ranging.

12. The method claimed in claim 10, wherein the step of asserting the second reset signal provided to a clock processing device comprises asserting the second reset signal provided to a clock phase aligner device.

13. The method claimed in claim 10, wherein the step of asserting the second reset signal provided to a clock processing device comprises asserting the second reset signal provided to a clock-data recovery device.

14. The method claimed in claim 10, wherein the training process uses a packet preamble.

15. The method claimed in claim 14, wherein the step of asserting a second reset signal comprises asserting a second reset signal provided to a clock phase aligner device of the burst-mode receiver.

16. The method claimed in claim 14, wherein the step of asserting a second reset signal comprises asserting a second reset signal provided to a clock-data recovery device of the burst-mode receiver.

17. The method claimed in claim 14, further comprising the step of delaying a predetermined time interval after the step of asserting a first reset signal and before the step of asserting a second reset signal to delay assertion of the second signal after assertion of the first reset signal by the predetermined time interval.

18. The method claimed in claim 17, further comprising the step of delaying the predetermined time interval between asserting the first reset signal and asserting the second reset signal a predetermined amount if the training process fails.

19. A method for initializing a burst-mode receiver of an optical line terminator (OLT) during an initialization phase in a passive optical network having an OLT and a plurality of optical network units (ONUs), comprising the steps of:
    transmitting an initialization message indicating initiation of ranging from the optical line terminator to an ONU;
    receiving a data packet signal from the ONU in response to the initialization message;
    in response to receiving the data packet signal from the ONU in response to the initialization message, asserting a first reset signal provided to an optical module of the burst-mode receiver, wherein the optical module receives optical signals representing data packets and performs a training process using a data packet preamble; and in response to receiving the data packet signal from the ONU in response to the initialization message, asserting a second reset signal provided to a clock processing device of the burst-mode receiver.

20. The method claimed in claim 19, further comprising the step of:

delaying a predetermined time interval after the step of asserting a first reset signal and before the step of asserting a second reset signal to delay assertion of the second signal after assertion of the first reset signal by the predetermined time interval.

21. The method claimed in claim 20, further comprising the step of:

delaying the predetermined time interval between asserting the first reset signal and asserting the second reset signal a predetermined amount if the training process fails.

\* \* \* \* \*

UNITED STATES PATENT AND TRADEMARK OFFICE
CERTIFICATE OF CORRECTION

PATENT NO. : 7,583,898 B1  Page 1 of 1
APPLICATION NO. : 11/403261
DATED : September 1, 2009
INVENTOR(S) : Dalton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 679 days.

Signed and Sealed this

Fourteenth Day of September, 2010

David J. Kappos
*Director of the United States Patent and Trademark Office*